Patented July 15, 1941

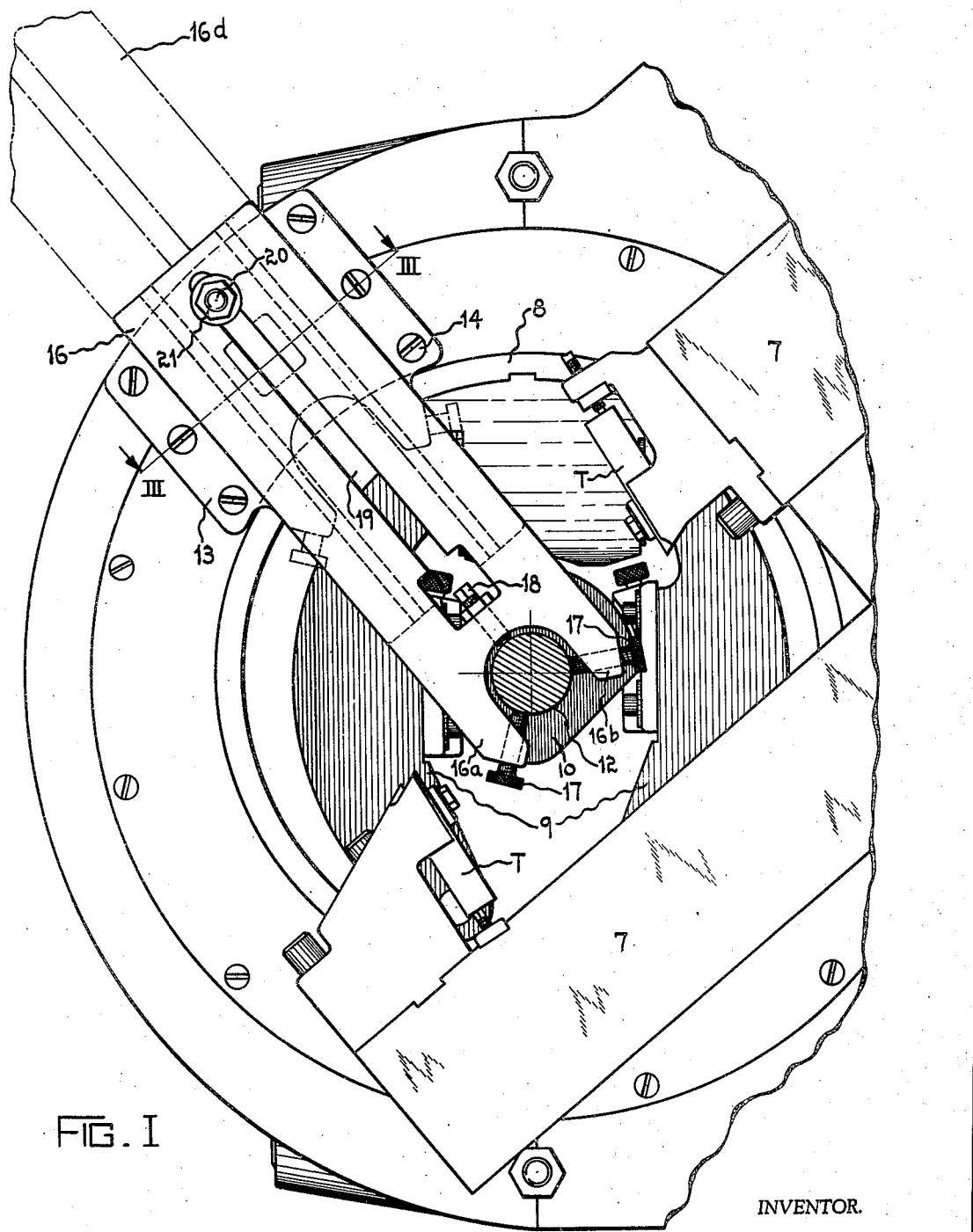
FIG. I

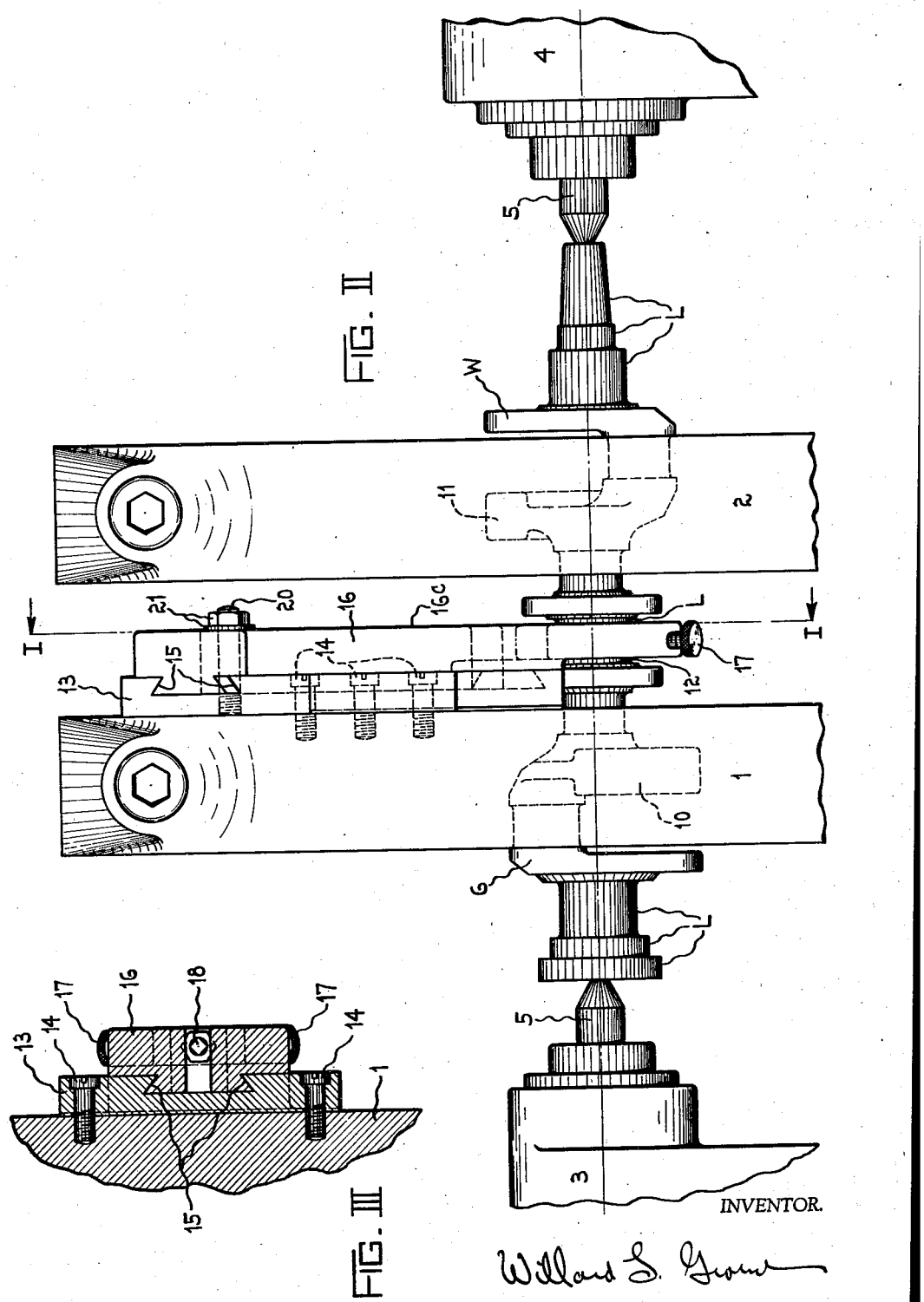

2,249,243

UNITED STATES PATENT OFFICE 2,249,243

CHUCKING MECHANISM

Willard L. Groene, Cincinnati, Ohio, assignor to The R. K. LeBlond Machine Tool Company, Cincinnati, Ohio, a corportion of Delaware Application February 15, 1940, Serial No. 319,051

14 Claims. (Cl. 82—9)

This invention pertains to the chucking of rough irregular prelocated work pieces in a machine tool. More particularly this invention is adapted to initially support a prelocated work piece in a lathe which is to be gripped by a chucking device by means of rough irregular surfaces on said work piece.

For illustrative purposes this invention is shown applied specifically to the chucking of a crankshaft in a double center drive crankshaft lathe for the purpose of having the various line bearings machined on said crankshaft.

An object of this invention is to provide a work supporting device which supports a rough irregular work piece accurately on its prelocated position on the axis of rotation of the lathe and holds said work rigid during the application of chucking devices which engage rough irregular portions of said work piece. It is then the object to remove this initial supporting device after the work piece has been properly chucked so that the cutting tools may then continue the machining operation on the crankshaft.

More specifically, an object of this invention is to provide in a center drive lathe, a means for initially supporting a rough irregular work piece on its prelocated axis in the lathe and then to apply the chucking devices of the center drive work spindles to the work piece while it is being held by this initial supporting device so that these chucks may engage the work rigidly and positively without distorting the work during the chucking operation. It is then the purpose to remove this initial holding or supporting device to the work piece so as to permit the crankshaft to be further machined by the cutting tools of the lathe.

This invention overcomes one of the most difficult problems of chucking a rough irregular work piece which has been prelocated in a lathe. It is a well known fact that when gripping such a rough irregular prelocated work piece the chucking device must have equalizing mechanism which permits the chuck to engage the work without distorting it from its true axis of rotation while at the same time these devices must have abilty to rigidly hold the work during the cutting operation of the cutting tools on the surfaces of the work. It is well known that in such an arrangement it is impossible heretofore to provide such chucking devices which were sufficiently free in equalizing movement to permit gripping the work without distorting it from its true prelocated position while at the same time providing sufficient rigidity for the chucking devices when holding the work during the cutting operation.

It is therefore the chief object of this invention to provide a device which will rigidly support the work while such chucking devices are initally clamping and gripping the work so that these devices may be made with their equalizing mechanism sufficiently rigid and resistant to movement to hold the work rigidly during the cutting operation while at the same time providing this unique device for holding the work rigidly during the initial chucking operation so that these relatively rigid equalizing members do not distort the work from its true prelocated position in the lathe.

Further features and advantages of this invention will appear from the detailed description of the drawings in which:

Figure I is an end elevation, partly in section on line I—I of Figure II, of a portion of a double center drive crankshaft lathe having chucking devices for gripping a rough irregular work piece and showing this unique pre-supporting device for the work piece in position on the frame of the lathe associated with the center drive rough work engaging chucking device.

Figure II is a front elevation of a portion of the double center drive lathe shown in Figure I.

Figure III is a section through the dovetail sliding mounting for the pre-supporting device shown on the line III—III of Figure I.

For illustrative purposes this invention is shown applied to a typical double center drive crankshaft lathe of a character shown in Patent No. 2,069,107 dated Jan. 26, 1937, having the center drive ring gear housings 1 and 2 and the tailstocks 3 and 4 appropriately mounted on the frame of the lathe. In each of the tailstocks 3 and 4 are provided axially movable centers 5 adapted to engage the ends of a crankshaft or work piece 6. The crankshaft here illustrated comprises the usual web portion W and the line bearing portion L which are to be simultaneously machined by appropriate cutting tool T carried on suitable tool feeding devices 7 in the frame of the lathe.

In each of the center drive ring gear housings 1 and 2 are journaled appropriate ring gears 8 which contain suitable chucking mechanisms indicated generally at 9 for gripping rough irregular webs 10 and 11 of the crankshaft 6 after it has been appropriately placed and thereby prelocated on the centers 5 of the lathe. Such a chucking device, for example, may be of a character as shown in application Serial No. 299,560 filed Oct. 14, 1939.

In conjunction with these centers 5 and the chucking devices 9 it is the object to provide an additional movable supporting device for the center line bearings 12 of the crankshaft 6 to support this bearing accurately without springing the shaft from its true prelocated position on the centers 5 of the lathe prior and during the engagement of the chucking devices 9 on the webs 10 and 11 of the crankshaft. After having thus chucked the shaft by means of the webs 10 and 11 this center line bearing supporting device is then to be removed from work engaging position to allow access of the various cutting tools 7 to machine the line bearing portions of the crankshaft. This initial supporting device for the center line bearing comprises a bracket 13 which is securely bolted to the center drive ring gear and by suitable screws 14 and has formed in it a dovetail guideway 15 in which nicely slides the work supporting member 16. This work supporting member 16 has a bifurcated end portion having the prongs 16a and 16b in which are nicely fitted the knurled set screws 17. In the crotch of this bifurcated end portion is also provided a suitable fixed abutment screw 18. Through the slotted portion 19 of the work supporting member 16 projects a clamp stud 20 fixed in the bracket 13 and having a nut and washer 21 which may be drawn down tightly against the face 16c of the work supporting member 16 for locking this member against the sliding movement in the guideways 15 and thereby locking it securely to the center drive ring gear housing 1.

The operation of this chucking mechanism is substantially as follows:

The crankshaft 6 is first placed through the center drive ring gear housings 1 and 2 and mounted on the centers 5 of the tailstocks 3 and 4 as is customary for lathes of this kind. Next, the work engaging member 16 which has up to this time been moved back to the withdrawn position shown at 16d is now moved downwardly having loosened the nut 21 until its abutment screw 18 nicely engages the rough bearing surface of the line bearing 12. The nut and washer 21 are then locked down tight rigidly clamping this work engaging member 16 to the center drive ring gear housing 1. The knurled set screws 17 are then lightly screwed down against this bearing 12. The crankshaft is therefore locked rigidly at its center against any possible movement or distortion from its true axially located position effected by the centers 5 at the ends of the shaft. The chucking devices in the center drive housings 1 and 2 are then operated to grip the webs 10 and 11 of the crankshaft firmly, and in so doing they do not distort the crankshaft or spring it from its true prelocated axial position because of the rigid support provided by the work engaging member 16. As soon as the chuck has properly engaged the webs 10 and 11, the knurled set screws 17 are then loosened and the nut 21 also loosened and the work engaging member 16 is slid back to withdrawn position and the lathe is then in condition for operation of the cutting tools upon the work piece. Having completed the turning operation on these line bearings L, the chucking devices in the center drive housings 1 and 2 are then released and the work withdrawn from the centers 5 in the usual manner. In this way, the crankshaft is chucked rigidly and firmly by means of its rough irregular surfaces with precision, strength and rigidity to prevent its distortion from its true prelocated position as caused by the cutting tools operating upon the work and at the same time the mechanism 16 prevents any distortion occurring in the shaft during the initial chucking operation which would otherwise take place if equalizing chucking devices having sufficient rigidity to hold the work during the roughing turning operation on the crankshaft.

Having thus fully set forth and described my invention what I claim as due and desire to secure by United States Letters Patent is:

1. In a lathe, means for prelocating a rough irregular work piece on the axis of rotation of said lathe, means engaging said work piece for initially supporting said work piece rigidly when positioned by said prelocating means, and chucking mechanism adapted to grip said prelocated work piece by rough irregular surfaces thereon while being held rigidly by said initial supporting means, and means for withdrawing said initial supporting means from engagement with the work after said chucking mechanism has been fully engaged on said work piece.

2. In a double center drive lathe, a pair of centers for supporting the ends of a work piece in prelocated position in said lathe, a work holding member located intermediate said centers adapted to rigidly hold said work piece in said prelocated position, chucking mechanism located intermediate said centers adapted to engage said work piece by means of rough irregular surfaces of said work piece while said work holding member is effectively rigidly holding said work piece in said prelocated position, and means for withdrawing said work holding member after said chucking mechanism has fully engaged said work piece.

3. In a double center drive crankshaft lathe, a frame, tailstocks mounted on said frame, centers in said tailstocks, means for engaging said centers in the ends of a crankshaft to be machined in said lathe to thereby preposition said crankshaft in axial alignment in said lathe, a work supporting member, movable into engagement with said crankshaft intermediate its ends, carried on the frame of said lathe, a pair of center drive ring gear chucking devices mounted each side of said work supporting member, chucking devices in each of said ring gears adapted to chuck said crankshafts by means of rough irregular surfaces thereon, means for engaging said work supporting member on the work piece during said chucking operation of said chucking devices on said work piece, and means for withdrawing said work supporting member from said work piece after said chucking devices have been engaged on said work piece.

4. In a center drive crankshaft lathe, a frame, a pair of tailstocks mounted on each end of said frame, centers in said tailstocks, means for engaging said centers in the ends of the work piece to be machined in said lathe to preposition said work piece in axial alignment in said lathe, a center drive chucking device mounted intermediate said centers, chucking mechanism in said center drive chucking device adapted to grip said work piece by means of rough irregular surfaces thereon, an initial work supporting device associated with said chucking device carried on the frame of said lathe, means for moving said chucking device into engagement with said work piece to initially hold said work piece during the chucking of said work piece by said chucking device, and means for withdrawing said work supporting member to withdrawn position when said chucking device has been fully engaged on said work piece.

5. In a lathe, means for prelocating a work piece on the axis of rotation of said lathe, a chucking device in said lathe adapted to grip said work piece, means associated with said chucking device adapted to initially rigidly hold said work piece accurately on said axis during the application of said chucking device to said work piece, and means for withdrawing said initial holding means after said chucking device has been engaged on said work piece.

6. In a lathe, means for prelocating a rough irregular work piece on the axis of rotation of said lathe, an equalizing chucking device adapted to engage and hold said work piece for rotating it by means of rough irregular work surfaces of said work piece, and means for initially rigidly holding said work piece in said prelocated position during the application of said equalizing chucking device to said work piece, said means withdrawing from said work piece when said chucking device is fully engaged on said work piece.

7. In a double center drive crankshaft lathe, a pair of tailstocks, centers in said tailstocks adapted to engage the ends of a crankshaft to be machined in said lathe to position it in prelocated position on the axis of rotation of said lathe, a pair of center drive housings, a center drive ring gear in each of said housings, equalizing chucking devices in each of said ring gears, adapted to engage rough irregular webs of said crankshaft for chucking and rotating it during the cutting action of cutting tools on bearing portions of said crankshaft, a work supporting member located between said center drive housing adapted to be moved into engagement with said work piece to rigidly hold said work piece during the application of said chucking devices on said work piece, and means for moving said work engaging member out of work engaging position after said chucking devices have been gripped on said work piece.

8. In a double centetr drive crankshaft lathe, a pair of tailstocks, centers in said tailstocks adapted to engage the ends of a crankshaft to be machined in said lathe to position it in prelocated position on the axis of rotation of said lathe, a pair of center drive housings, a center drive ring gear in each of said housings, equalizing chucking devices in each of said ring gears, adapted to engage rough irregular webs of said crankshaft for chucking and rotating it during the cutting action of cutting tools on bearing portions of said crankshaft, a work supporting member located between said center drive housings adapted to be moved into engagement with said work piece to rigidly hold said work piece during the application of said chucking devices on said work piece.

9. In a double center drive crankshaft lathe, a pair of tailstocks, centers in said tailstocks adapted to engage the ends of a crankshaft to prelocate it on the axis of rotation of said lathe, a pair of center drive chuck housings, a pair of ring gears rotatably mounted in said housings, equalizing chucking mechanism in each of said ring gears adapted to engage said crankshaft by means of rough irregular webs thereof, an initial work supporting device mounted on one of said center drive ring gear housings, means for moving said device into engagement with a rough line bearing of said crankshaft whereby said crankshaft is rigidly supported against distortion from its true axial prelocated position in said lathe, and means for applying said equalizing chucking devices to said work piece while said work piece is so held by said work engaging member, and means for moving said work engaging member from engagement with said rough line bearings after said chucking device has engaged the rough irregular webs of said crankshaft.

10. In a double center drive crankshaft lathe, a pair of tailstocks, centers in said tailstocks adapted to engage the ends of a crankshaft to be machined in said lathe, a pair of center drive housings located intermediate said centers, rotary ring gears mounted in said housings, equalizing chucking devices in each of said ring gears adapted to engage rough irregular webs of said crankshaft, an initial supporting device for said crankshaft, effective during the chucking of said crankshaft by said chucking devices, comprising a member movable into engagement with said crankshaft intermediate said centers, means for locking said member in engagement with one of the ring gear housings of said lathe for rigidly supporting said crankshaft during the clamping of said chucking devices on said crankshaft.

11. In a lathe, means for prelocating a work piece on the axis of rotation of said lathe, means for initially rigidly holding said work piece intermediate its ends in said prelocated position, means for chucking said crankshaft while so supported, and means for withdrawing said initial holding means after said chucking mechanism has been engaged on said work piece.

12. In a crankshaft lathe, a new article of manufacture, comprising a prelocating device for use in holding a crankshaft in a predetermined aligned position without deflection while chucking devices are being applied, said new article of manufacture comprising a detachably supported arm on a crankshaft chuck, and means on said arm for engaging a crankshaft and adjustably positioning it in aligned position while it is being chucked.

13. In a crankshaft lathe, means comprising a support at either end of a crankshaft, maintaining it in aligned position and permitting its rotation in such position, a crankshaft chuck having means for engaging said crankshaft to hold it in aligned position and rotate it, and means mounted on said chuck comprising prealigning means for engaging said crankshaft to hold it in position while it is being chucked to prevent distortion of the crankshaft out of its aligned position while being so chucked.

14. In a crankshaft lathe, a chuck comprising means for engaging a bearing portion of a crankshaft to hold said crankshaft in predetermined axial position with respect to the center of the chuck, an additional means for engaging crankshaft web portions in order to chuck and rotate said crankshaft in said lathe, said means for engaging a bearing portion of said crankshaft to hold them in predetermined alignment being detachable from said crankshaft after said crankshaft has been chucked in said lathe.

WILLARD L. GROENE.